(12) United States Patent
Dorin et al.

(10) Patent No.: US 7,922,240 B2
(45) Date of Patent: Apr. 12, 2011

(54) SLATTED ROOF FOR A MOTOR VEHICLE

(75) Inventors: Florian Dorin, Köln (DE); Stephan Lange, Wuppertal (DE); Roland Brambrink, Ratingen (DE); Ulrich Grosser, Kürten (DE)

(73) Assignee: Bayer MaterialScience AG, Leverkusen (DE)

(*) Notice: Subject to any disclaimer, the term of this patent is extended or adjusted under 35 U.S.C. 154(b) by 0 days.

(21) Appl. No.: 12/254,401

(22) Filed: Oct. 20, 2008

(65) Prior Publication Data

US 2009/0102245 A1 Apr. 23, 2009

(30) Foreign Application Priority Data

Oct. 19, 2007 (DE) .................. 10 2007 050 462

(51) Int. Cl.
*B60J 7/047* (2006.01)
(52) U.S. Cl. .................. 296/214; 296/219; 296/220.01; 160/84.06
(58) Field of Classification Search .................. 296/214, 296/219, 220.01; 160/84.06
See application file for complete search history.

(56) References Cited

U.S. PATENT DOCUMENTS

| 5,421,635 | A | | 6/1995 | Reinsch et al. | |
|---|---|---|---|---|---|
| 5,603,372 | A | * | 2/1997 | Farmont et al. | 160/370.21 |
| 5,823,605 | A | * | 10/1998 | Seargeant | 296/100.09 |

FOREIGN PATENT DOCUMENTS

| DE | 4123229 A1 | | 1/1993 | |
|---|---|---|---|---|
| DE | 42 33 507 C1 | | 11/1993 | |
| DE | 4415649 C1 | | 6/1995 | |
| DE | 197 11 333 A1 | | 9/1998 | |
| DE | 19711333 | * | 9/1998 | |
| DE | 103 20 538 A1 | | 12/2004 | |
| EP | 0591644 A2 | | 4/1994 | |
| EP | 0 897 820 A2 | | 7/1998 | |
| FR | 635826 | * | 12/1928 | 296/219 |
| GB | 2257669 A | | 1/1993 | |

* cited by examiner

*Primary Examiner* — Dennis H Pedder
(74) *Attorney, Agent, or Firm* — Connolly Bove Lodge & Hutz LLP

(57) ABSTRACT

A slatted roof for a motor vehicle comprises a plurality of slats connected to one another in a material-bonded manner. The slats are guided laterally in guide rails by pegs and are moveable between a closed position, in which the slats block an opening in the roof, and an open position, in which the slats are pushed and folded together in one region of the roof. Each slat has two first opposed sides and two second opposed sides, and the slats are connected along the second opposed sides. Each first opposed side includes at least two pegs, wherein, for all slats except for an end slat, two of the pegs on each of the first opposed sides are of different dimensions, and wherein two opposed pegs on the first opposed sides of each slat are of identical dimensions.

19 Claims, 7 Drawing Sheets

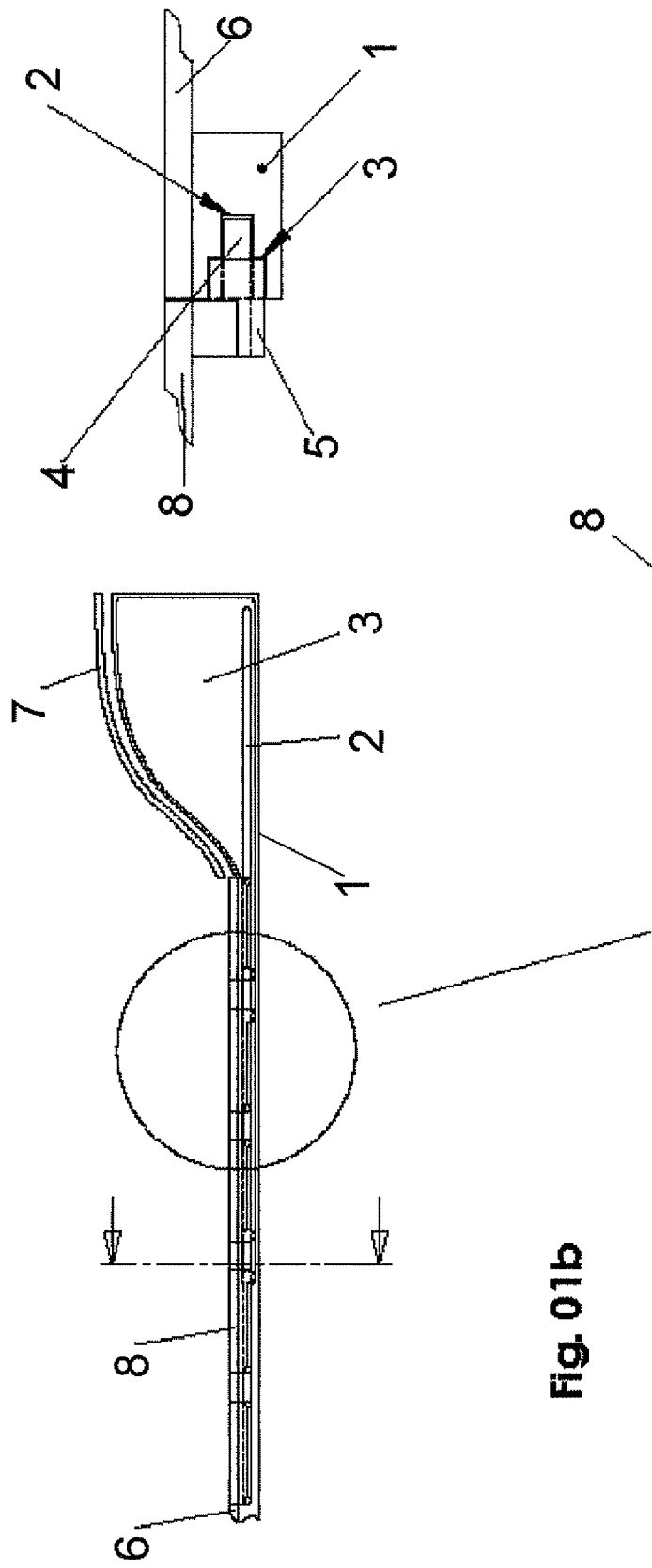

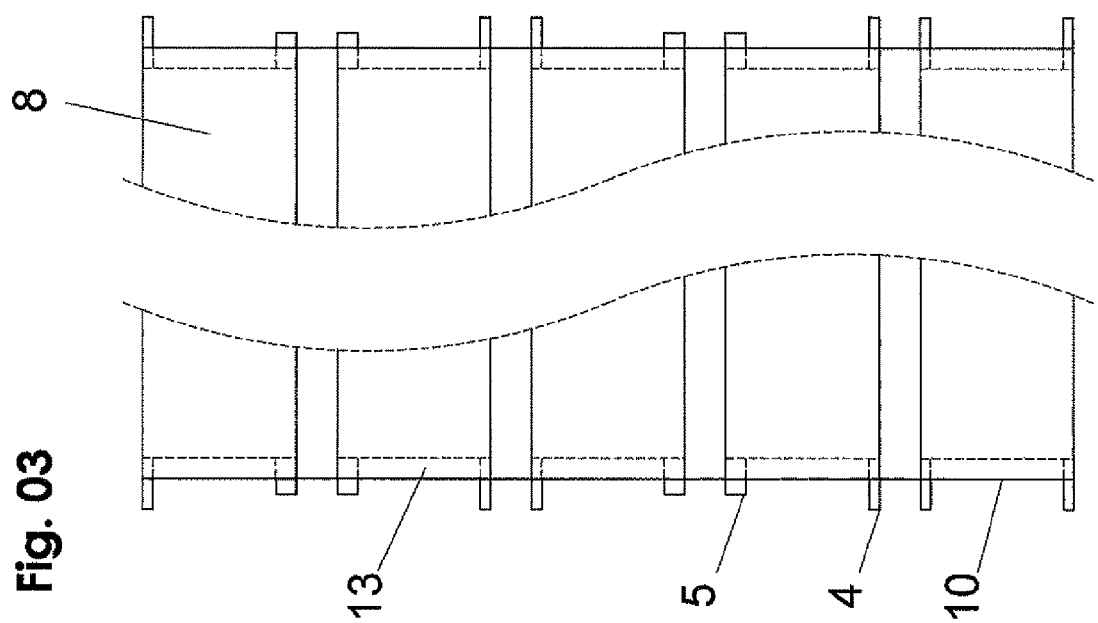
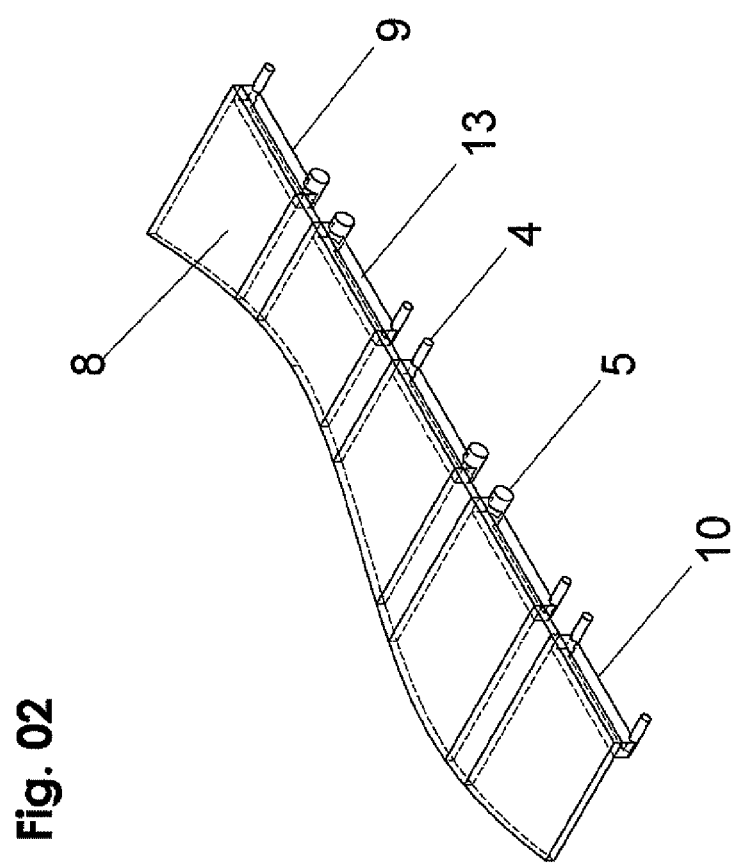

SLATTED ROOF FOR A MOTOR VEHICLE

BACKGROUND OF THE INVENTION

1. Priority

Priority is claimed to German Patent Application No. 102007050462.6, filed Oct. 19, 2007. The disclosure of the aforementioned priority application is incorporated herein by reference in its entirety.

2. Field of the Invention

The field of the present invention is slatted roofs for motor vehicles.

3. Background

In the vehicle roof according to German Utility Model 1 811 690, the two guide points on each slat are formed by pegs which project laterally, in each case, from a guide cheek attached to the underside of the slat in question. The two pegs lie at different heights and engage in guide tracks belonging to a guide rail which is integral with the roof, which guide tracks lie parallel and at a distance from one another. When the roof is opened, the pegs which lie at the front in the direction of opening in each case leave the appertaining guide track one after another, while at the same time the slat in question is caused, in a manner of which no further details are disclosed, to perform a pivoting movement about the other peg, which remains in its guide track. Another vehicle roof, in which both the guide points on the slats are held in engagement with the guides within the entire range of adjustment of the slats in order to increase the robustness and to hold said slats securely, is described in German Patent Application P 41 23 229.1. Patent Application EP 0 591 644 A2 describes a vehicle roof in which the slats are continuously guided in two guide rails and thus guarantee lasting robustness. The guide rails are arranged at a distance from one another and guide the slats in such a way that they lie one below another after the fashion of a roller blind in the situation in which a roof is open.

Patent DE 44 15 649 describes guidance of slats in a vehicle roof in which each slat is provided laterally with one gate-type guide each in which a rear bearing point of the next adjoining slat, in each case, in the forward direction is guided in a constrained manner, and the final slat in the rearward direction can be raised by means of a separate control apparatus.

The literary references mentioned all exclusively describe slat systems which are not connected to one another in a material-bonded manner.

SUMMARY OF THE INVENTION

The present invention is directed toward a slatted roof for a motor vehicle. A plurality of slats are connected to one another in a material-bonded manner, are guided laterally in guide rails by pegs, and are moveable between a closed position, in which the slats block an opening in the roof, and an open position, in which the slats are pushed and folded together in one region of the roof. Each slat has two first opposed sides and two second opposed sides, the slats being connected to adjacent slats along the second opposed sides. Each first opposed side of each slat includes at least two pegs. For each first opposed side of all slats, apart from an end slat, two of the pegs are of different dimensions. For all slats, opposed pegs on the first opposed sides are of identical dimensions.

Accordingly, an improved slatted roof for a motor vehicle is disclosed. Advantages of the improvements will appear from the drawings and the description of the preferred embodiment.

BRIEF DESCRIPTION OF THE DRAWINGS

In the drawings, wherein like reference numerals refer to similar components:

FIG. 1 illustrates a side-elevation sectional view of material-bonded slats with a hood box;

FIG. 1a illustrates a sectional view of a guide rail with pegs;

FIG. 1b illustrates a detail sectional view of slats with guide elements;

FIG. 2 illustrates an isometric view of slats with pegs on the end faces as guide elements;

FIG. 3 illustrates a plan view of slats with guide elements;

DETAILED DESCRIPTION OF THE PREFERRED EMBODIMENTS

As used herein, the expression "slatted roof" means a device consisting of elements which are alternately stiff and flexible and are arranged parallel to one another, such as, for example, at least two slats made of plastic such as polycarbonate (PC), polymethyl methacrylate (PMMA, acrylic glass or Plexiglas) and arranged parallel to one another, wherein the slats are connected in a material-bonded manner, over the predominant part, i.e. as a rule over 75% and, ideally, 100% of the longitudinal sides of the slats, by elastomer such as, for example, polyurethane, thermoplastic polyurethane or silicone.

The guide rail [1] shown in FIG. 1, FIG. 1a, and FIG. 1b consists of a deep plane [2] and a further, shallow plane [3] which extend one behind the other. As used herein, "one behind the other" means that there is a front and a rear plane, and the two planes extend, parallel to one another, along parts of the roof skin. The rear plane is arranged in such a way that a long peg is capable of protruding through the front plane and being guided in the rear plane. At the same time, a short peg can be guided in the front plane without being affected by the rear plane. This arrangement is intended to permit the pegs, which are of different lengths (and have cross-sections that differ under certain circumstances), to be guided in a targeted manner in the guide rail, i.e. initially follow a curved path and finally follow a different path in a defined region. The number of planes can naturally be varied freely. Thus it is possible to add, for example, a third or even a fourth plane in order to be able, optionally, to guide individual slats differently or even individually.

Figure 4:
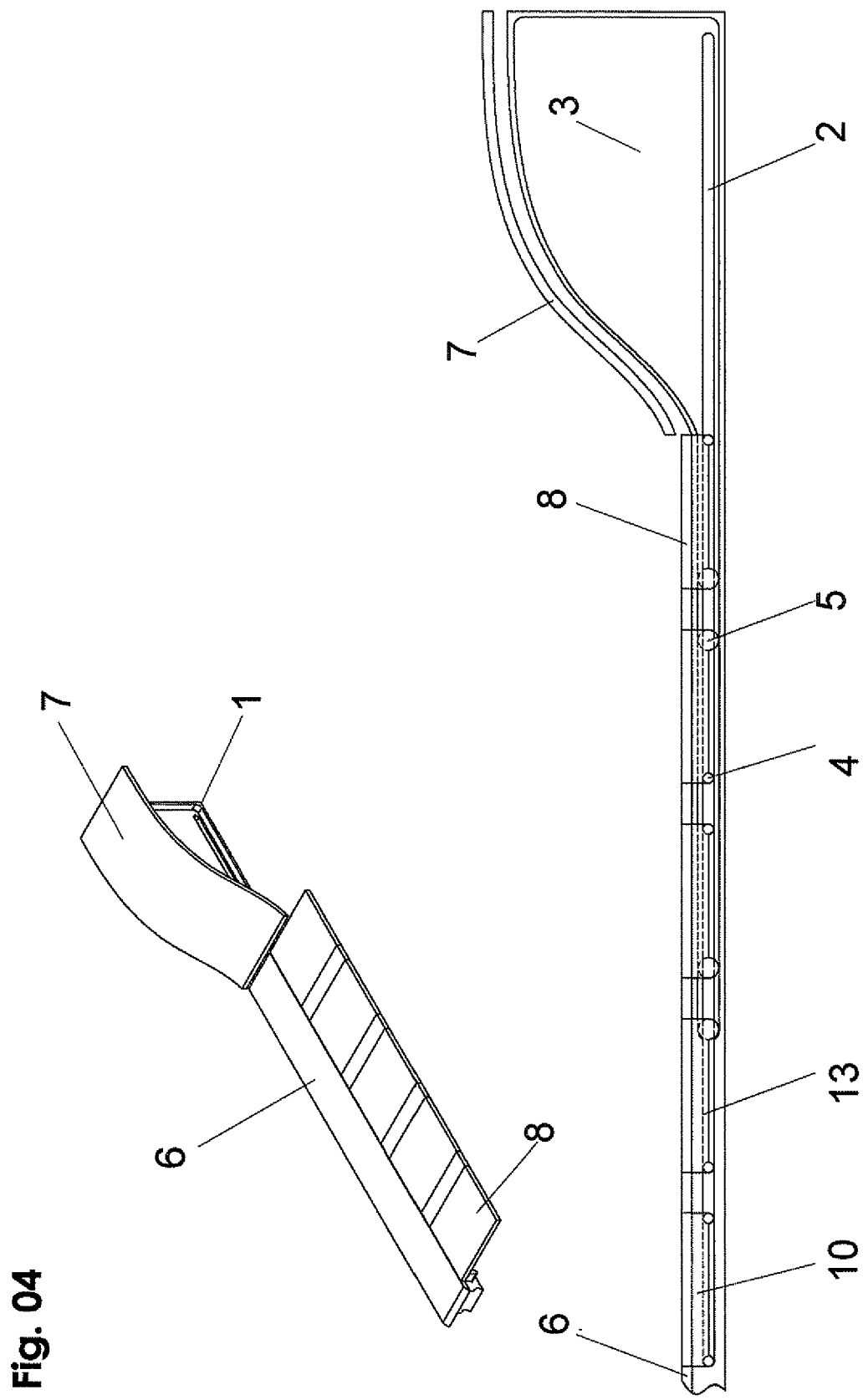
FIG. 4 illustrates a closed roof and corresponding isometry.
Figure 5:
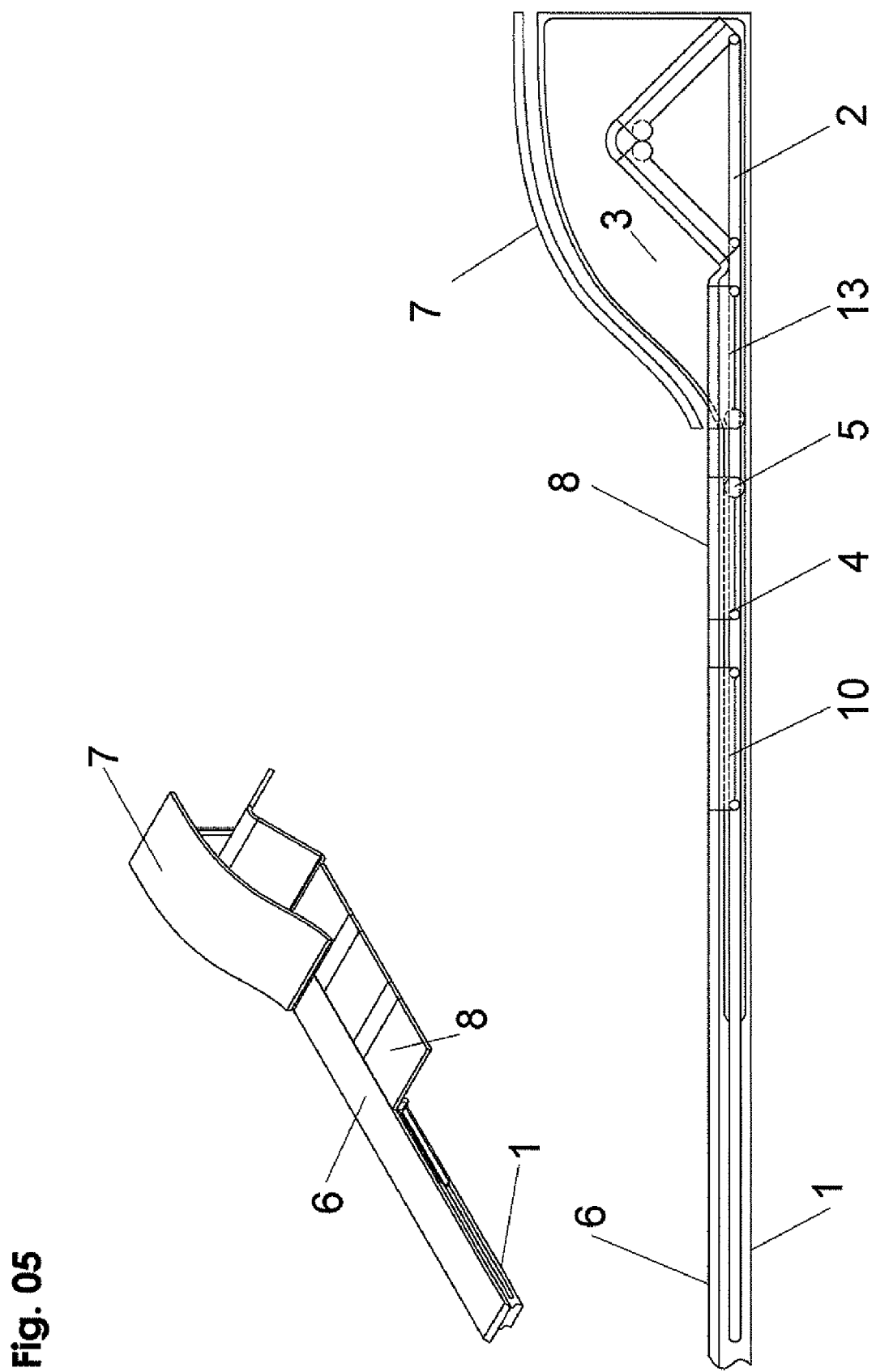
FIG. 5 illustrates a half-open roof and corresponding isometry.
Figure 6:
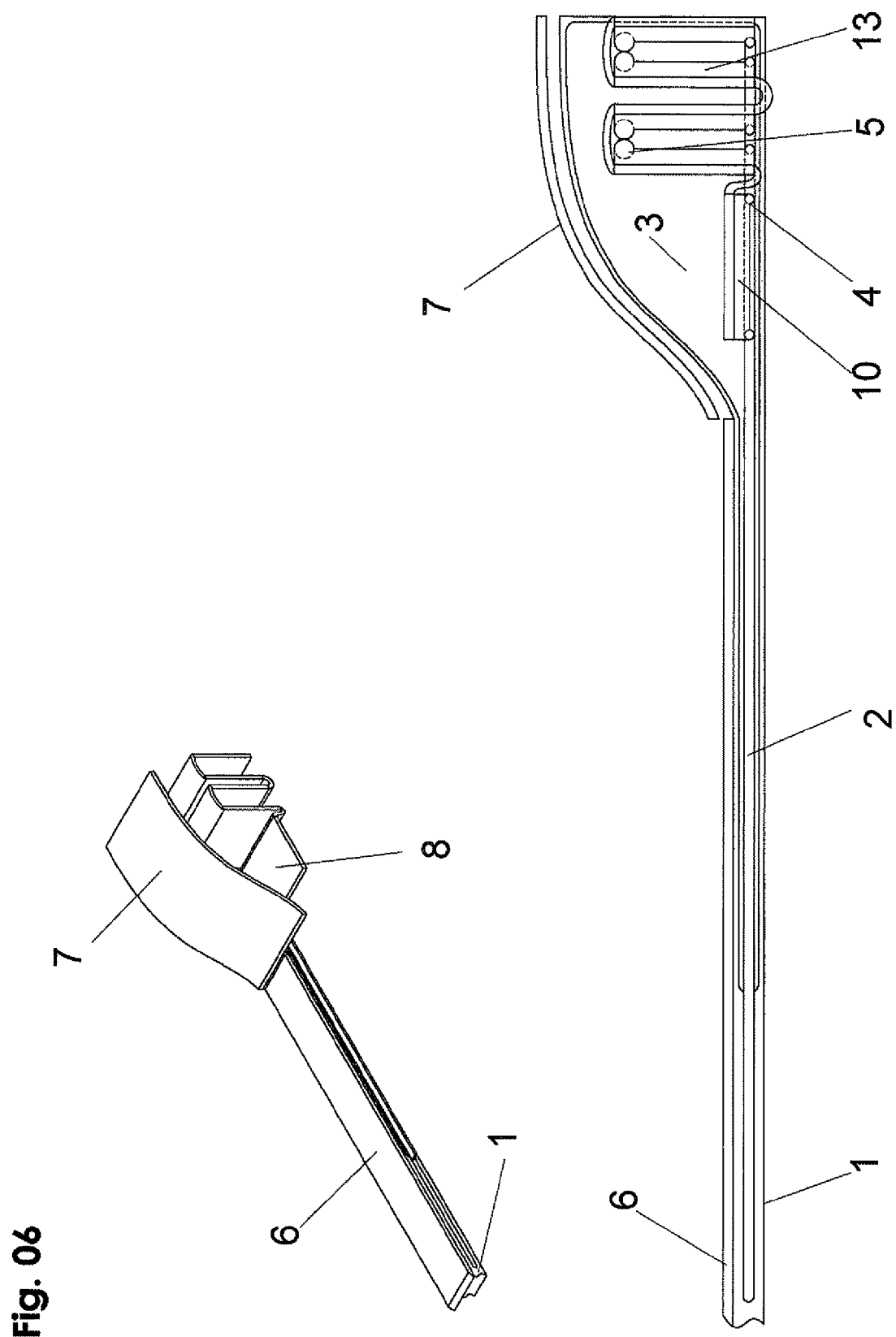
FIG. 6 illustrates an open roof and corresponding isometry.

These planes are formed by way of grooves. Differently shaped pegs [4] and [5] protrude into these grooves. The path of said pegs within the planes of the guide rail is regulated by way of different peg lengths or peg widths. The longer peg [4] runs along the deep plane [2], and the shorter peg [5] runs along the shallow plane [3]. It is thus possible, by means of the planes which lie one behind the other, to save on the height of the installation space. The grooves may also lie one above the other. The two planes extend parallel to the outer skin (roof skin) [6] until the hood box [7] is reached, so that the slats [8] can be displaced in the form of a continuous face. Only inside the hood box do the planes diverge from one another, for example in a V-shaped manner, so that, for example, the pegs for the deep plane continue to run along the roof contour, or horizontally in relation to the latter, and the short pegs are directed upwards, as shown in FIG. 4, 5 or 6.

Obviously, it is also possible for the slats to be folded up in the downward direction or centrally. It is likewise conceivable for the long peg to not be exclusively responsible for deflection, and for the short peg to likewise be capable of deflecting the slats.

However, the planes do not have to be activated solely by way of the length of the pegs. There is also the possibility of regulating the activation by way of different cross-sections, as shown in FIGS. 2 and 3.

For example, there are two pegs each on each slat on the two sides A [9]; in the case of each end face, there are one short peg and one long peg. Only in the case of the end slat [10] may there be two identical pegs, if said slat is not to be folded up as well. The existence of these two pegs per side guarantees that the roof is able to extend parallel to the roof skin, even in the half-open condition, and does not bend in an uncontrolled manner in the event of wind and loads caused by snow. As can be seen from the description and examples above, the folding-up kinematics are significantly simplified when at least one element, e.g., the end slat, is guided in a "controlled" manner, and for the others to be capable of moving "freely".

Figure 7:
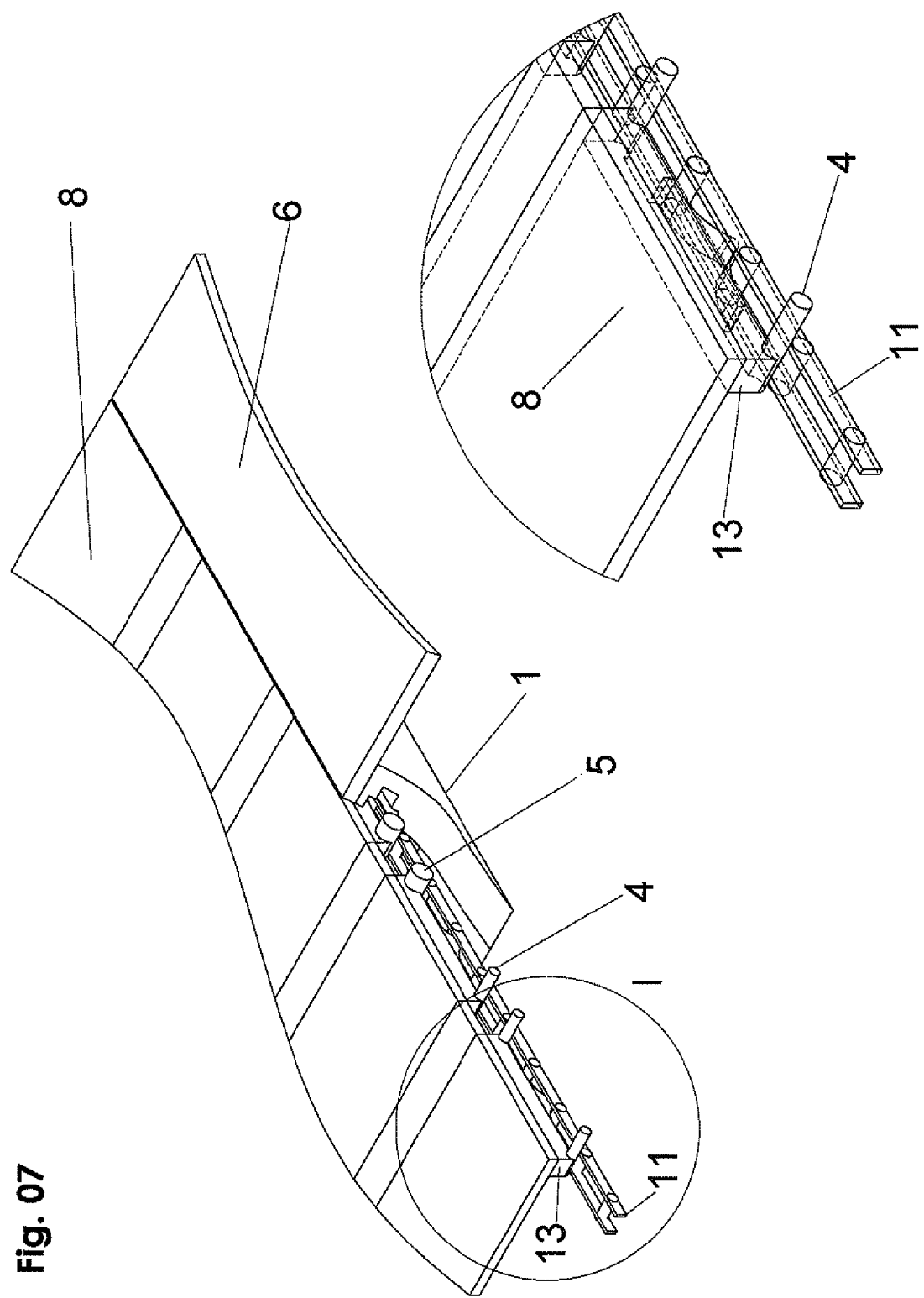
FIG. 7 illustrates a chain drive with corresponding detail.
Figure 8:
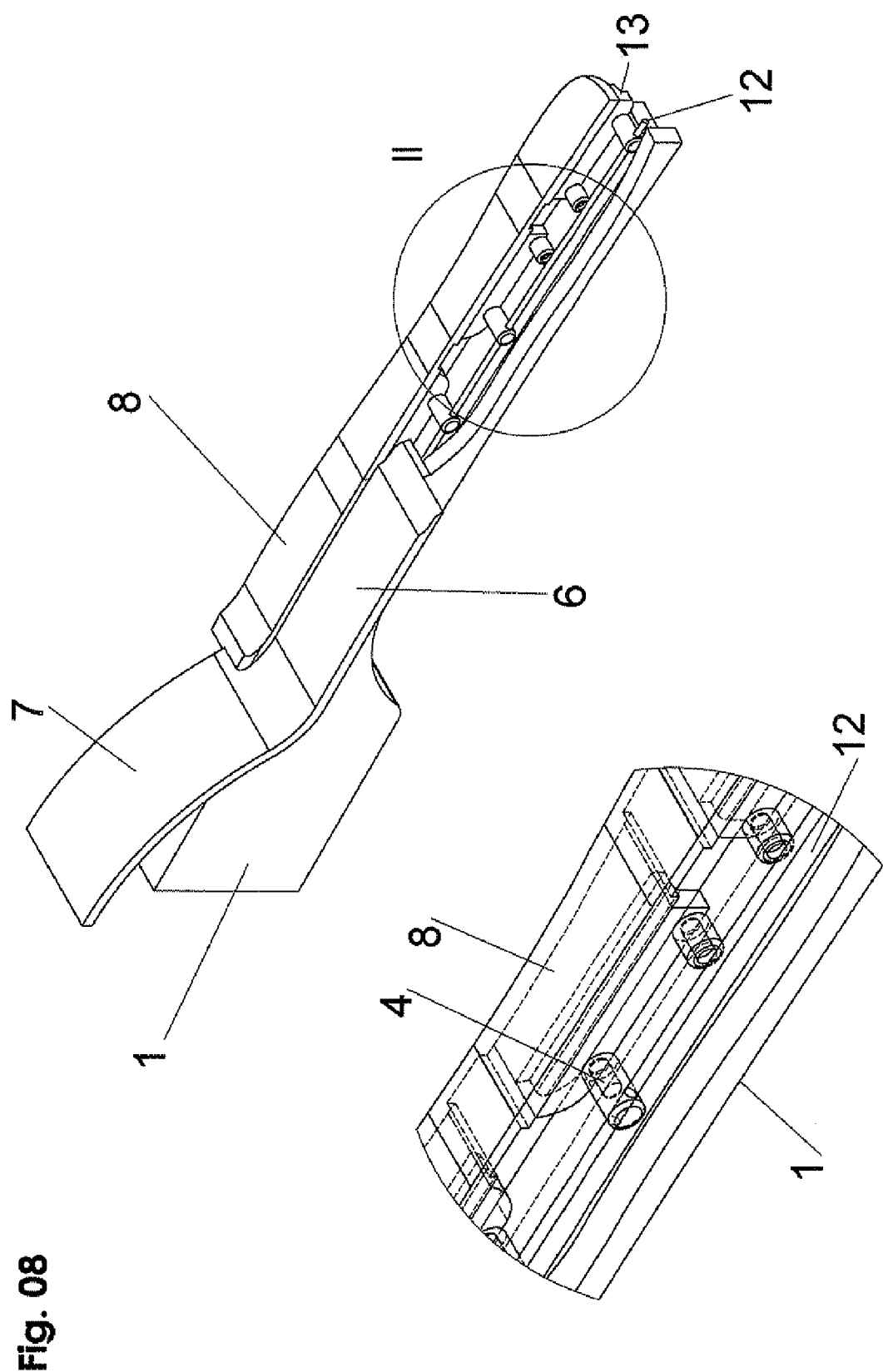
FIG. 8 illustrates a worm drive with corresponding detail.

The slants may be driven by, for example, a chain [11], i.e. a "chain driven" (FIG. 7), or a threaded rod [12], i.e. a "worm drive" (FIG.8), or a belt drive. A cable pull should also be possible (as in conventional sliding roofs).

The pegs themselves represent both a bearing which is translatory along the guide rail and also one which is rotatory about its own axis.

Slat structures which are connected in a material-bonded manner can be moved by means of these guide kinematics, however it is also conceivable that it should be possible to move individual slats, which are not connected to one another in a material-bonded manner, in this way.

The complete disappearance of the slats and the possibility of partial opening with plane-parallel faces are favourable, both in respect of the aerodynamic behaviour and in respect of the external appearance.

The slats may be located below, above or at the same height as the guide elements [13], i.e. the holders with pegs. If the slats lie at the same height as the guide elements, they thus form a depression, and the same applies in the event of the slats lying below the guide elements. If the slats lie above the guide elements, it is possible, in this way, to produce a continuous roof skin which is likewise to be regarded as favourable in respect of the external appearance. In this way, moreover, there are no projecting corners or edges on which people might be injured in the event of an accident.

The guide rails can be used both for roof structures having slats which are arranged transversely to the direction of travel and for ones having slats which are arranged longitudinally to said direction.

The examples above illustrate guide kinematics for a slatted structure which is connected in a material-bonded manner. Since the described examples are in the context of a vehicle roof, it is advantageous for the guide rails to take up the smallest possible installation space. In addition, it is advantageous for the guide rails to be as simple as possible, geometrically speaking, and have effectively one groove over their height. Furthermore, the slats are advantageously run in a manner plane-parallel to the plane of the roof and are capable, only at the end, of being folded up in a device, such as a hood box for example. The slats are also advantageously mounted at all four corner points for reasons of stiffness in the region of plane-parallelism. Variations and deviations from these advantages may be employed according to design preferences.

Thus, a slatted roof for a motor vehicle is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A roof for a motor vehicle, the roof comprising
a plurality of slats are connected to one another in a material-bonded manner, are guided laterally in guide rails by pegs, and are movable between a closed position, in which the slats block an opening in the roof, and an open position, in which the slats are pushed and folded together in one region of the roof,
characterised in that each slat has two first opposed sides and two second opposed sides, the slats being connected to adjacent slats along the second opposed sides, and each first opposed side including at least two pegs, wherein, for all slats apart from an end slat, two of the pegs on each first opposed side are of different dimensions, and wherein opposed pegs on the first opposed sides of each slat are of identical dimensions, and
each of the guide rails comprises first and second grooves, wherein pegs of one of the dimensions on all slats apart from the end slat move in the first grooves of the guide rails and the first grooves are configured such that the pegs of one of the dimensions disengage from the first grooves when the slats are moved toward the open position, while pegs of the other of the dimensions move in the second groves of the opposing guide rails and the second grooves are configured such that the pegs of the other of the dimensions continue to engage the second grooves.

2. The slatted roof according to claim 1, characterised in that the two first opposed sides extend transversely to a direction of travel and the two second opposed sides extend longitudinally to the direction of travel.

3. The slatted roof according to claim 1, characterised in that two pegs which lie side by side, in front of and behind the material-bonded connection, on adjacent connected slats, are of identical dimensions in each case.

4. The slatted roof according to claim 1, characterised in that one of the two of the pegs on each respective first opposed side is longer than the other of the two pegs.

5. The slatted roof according to claim 1, characterised in that one of the two of the pegs on each respective first opposed side is wider than the other of the two pegs.

6. The slatted roof according to claim 1, characterised in that the first and second grooves in each of the guide rails have different respective depths.

7. The slatted roof according to claim 6, characterised in that the first and second grooves are parallel outside of a hood box.

8. The slatted roof according to claim 6, characterised in that first and second grooves diverge from one another inside a hood box.

9. The slatted roof according to claim 1, characterised in that all pegs on the end slat have the same dimensions.

10. The slatted roof according to claim 1, characterised in that the folding arrangement is moved by a drive apparatus.

11. A roof for a motor vehicle, the roof comprising
a pair of opposing guide rails; and a plurality of slats, each being connected to immediately adjacent slats in a material-bonded manner, the slats being movable between a closed position, in which the slats block an opening in the roof, and an open position, in which the slats are pushed and folded together in one region of the roof, wherein each slat includes at least two pegs on each of two opposing sides, the pegs on the opposing sides engaging the opposing guide rails, respectively, and the guide rails laterally guiding the slats between the open position and the closed position, each opposing side of each slat, except for an end slat, includes two pegs having different dimensions, at least one peg on each opposing side of each slat is axially aligned with another peg on the other opposing side, the axially aligned pegs having identical dimensions, and pegs of one of the dimensions on all slats apart from the end slat disengage from the guide rails when the slats are moved toward the open position, while pegs of the other of the dimensions remain engaged with the guide rails.

12. The slatted roof according to claim 11, wherein the guide rails extend along the longitudinal direction of the vehicle.

13. The slatted roof according to claim 11, wherein two pegs which lie side by side, each on adjacent slats, are of identical dimensions.

14. The slatted roof according to claim 11, wherein pegs of different dimensions vary in length.

15. The slatted roof according to claim 11, wherein pegs of different dimensions vary in width.

16. The slatted roof according to claim 11, wherein each guide rail includes grooves of different dimensions.

17. The slatted roof according to claim 16, wherein the grooves in the opposing rails are parallel outside of a hood box.

18. The slatted roof according to claim 11, all pegs on the end slat have identical dimensions.

19. The slatted roof according to claim 11, further including a drive apparatus adapted to move the folding arrangement between the open position and the closed position.

* * * * *